Nov. 8, 1927. 1,648,754
F. D. CARPENTER
TRANSMISSION GEAR LOCK
Filed July 13, 1926 2 Sheets-Sheet 2
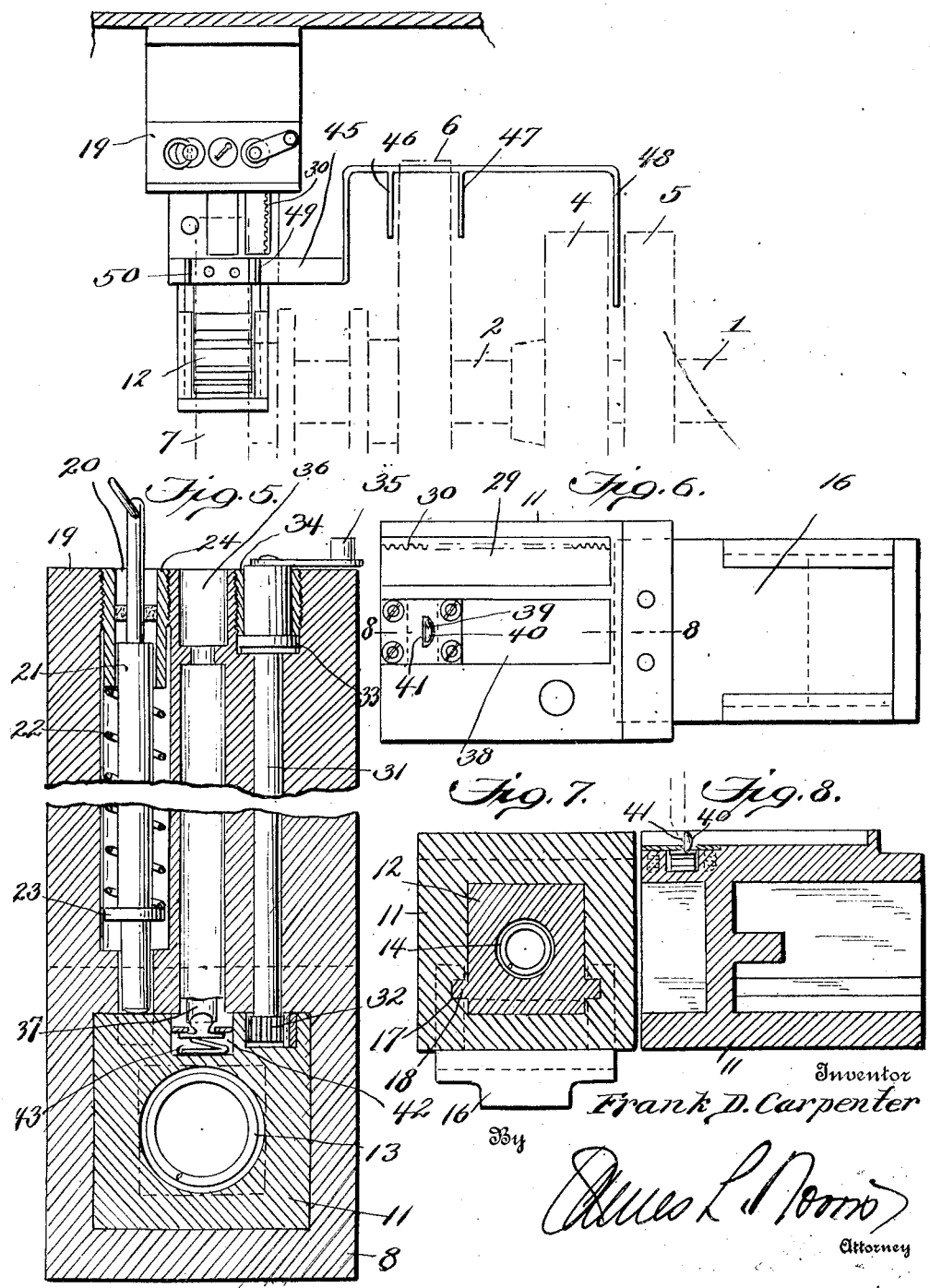
Inventor
Frank D. Carpenter Patented Nov. 8, 1927.

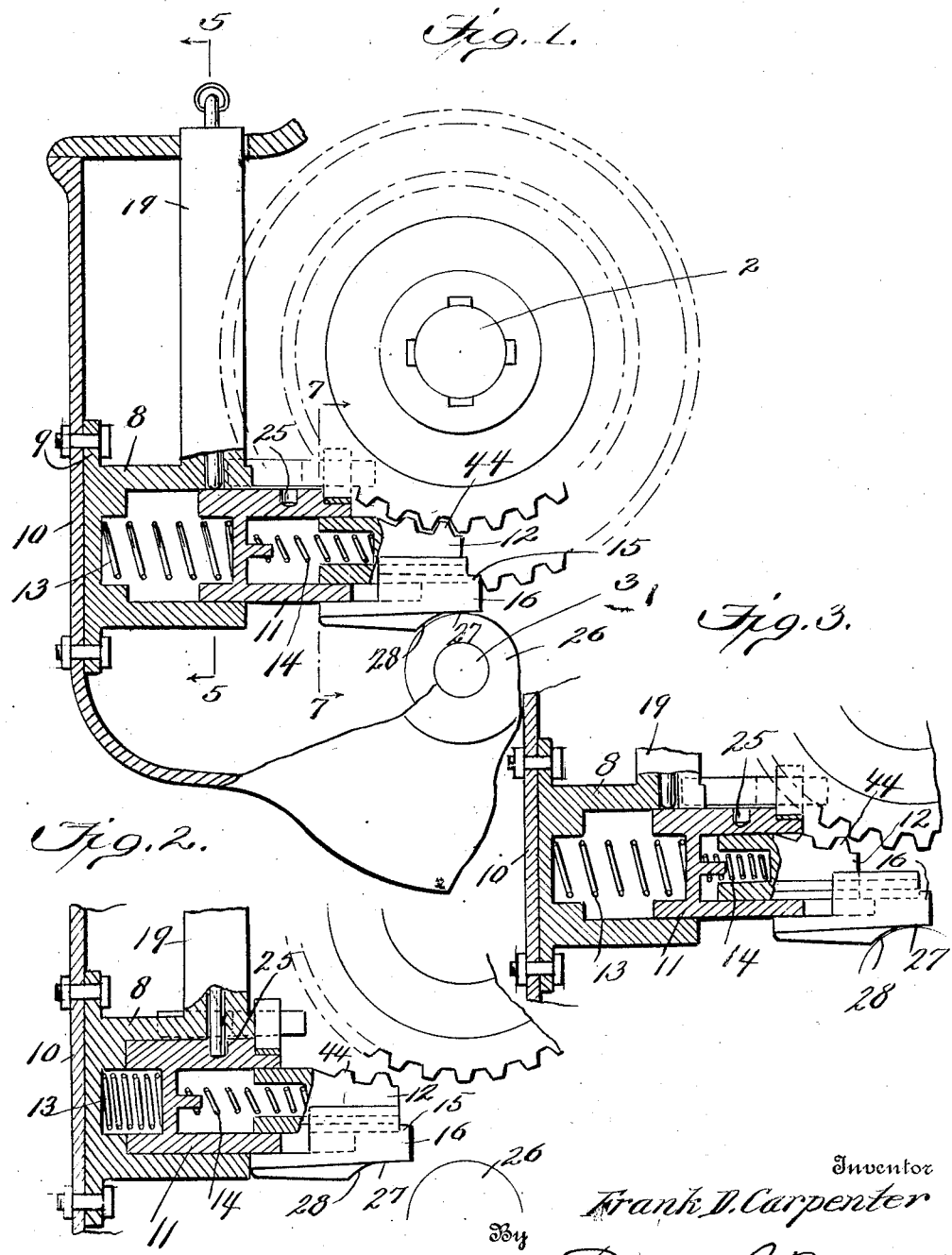

1,648,754

UNITED STATES PATENT OFFICE.

FRANK D. CARPENTER, OF CONCORD, NEW HAMPSHIRE, ASSIGNOR, BY DIRECT AND MESNE ASSIGNMENTS, TO THE GATES CORPORATION, OF CONCORD, NEW HAMPSHIRE, A CORPORATION OF NEW HAMPSHIRE.

TRANSMISSION GEAR LOCK.

Application filed July 13, 1926. Serial No. 122,238.

This invention relates to transmission gear-locks for auto vehicles and has for its principal object the provision of means for locking the gears against rotation, and in neutral position, so that the vehicle may not be moved in a forward direction.

In known types of transmission locks the gear shaft lever alone is locked in neutral position, but this does not prevent turning of the gears when it is attempted to move the vehicle by extraneous force, and a vehicle so locked may be towed away without impediment. The present invention provides means making it impossible either to rotate the shaft upon which the sliding gears are mounted or to shift any of the sliding gears to a position in which they may actively engage one of the engine-driven gears when one of the gears is locked.

Another object of the invention is the provision, in a gear lock of the class described of means whereby the lock yields when the vehicle is moved rearwardly. This feature is essential in order to comply with certain town ordinances which require that a vehicle must be so locked as to be free to be moved in case of emergency, and at the same time it affords no opportunity for an unauthorized person to tow the car away, since it is not practical to tow a car backwards on account of the inability to make the front or steering wheels track with the rear wheels.

Still another object of the invention is to provide a transmission gear-lock which automatically moves to locking position upon release of a catch, the use of a key being necessary only to unlock the mechanism.

Still another object of the invention is the provision of a transmission gear-lock, which by unimportant changes in the size or proportions of certain of its parts, may be adapted for use with any of the designs of transmission mechanism now in use, without departing from the principles of the invention.

Other objects of the invention will appear as the following description of an illustrative embodiment thereof proceeds.

In the drawings:—

Fig. 1 is a transvrse section through a transmission gear-lock constructed according to the principles of the present invention, showing the gear lock in operative relation to the gear case and the gears.

Figure 2 is a similar view, parts being broken away showing the gear-lock in position of release.

Figure 3 is a similar view showing the position assumed by parts of the gear-lock when the vehicle is moved in a reverse direction, the lock being also in gear locking position.

Figure 4 is a plan view of the transmission lock.

Figure 5 is a vertical section taken along the line 5—5 of Figure 1.

Figure 6 is a plan view of the lock carriage.

Figure 7 is a section taken along the line 7—7 of Figure 1.

Figure 8 is a longitudinal section taken along the line 8—8 of Figure 6.

Referring now in detail to the several figures, and first adverting to the enumeration of parts which are old and well known in the selective type transmission mechanism having three speeds forward and one reverse, the reference numeral 5 represents a gear which is permanently and slidably connected to the clutch shaft 1 driven by the engine, the clutch mechanism not being shown. Reference numeral 2 represents the main gear set shaft that drives the rear wheels of the auto vehicle. The reference numeral 3 denotes a lay shaft or countershaft which carries a gear not shown, constantly in mesh with the gear 5 on the engine driven shaft 1. It therefore follows that the lay shaft 3 is constantly driven through the engine driven shaft 1 so long as the clutch mechanism is in engagement. Mounted non-rotatably, but independently slidable upon the shaft 2 are sliding gears 5, 6 and 7. The gears 4 and 5 have elements on their adjacent faces which are brought together when the gear 5 is slid into contact with the gear 4 so that the shaft 2 is then directly driven through the engine shaft 1. This represents the position of high gear or third speed forward transmission. The gears 6 and 7 may be slid into operative engagement with certain gears, not shown, on the lay shaft representing the low and intermediate gear ratio respectively. It is apparent that by locking either of the sliding gears 6 or 7 against rotation the shaft 2 will be locked against rotation and the rear wheels of the vehicle cannot turn, but it is also important that the gear 5 be restrained from going into engagement with the gear 4, and that the gears 6 and 7 be kept from meshing with the engine driven gears on the lay shaft, for should it be possible to place any of these sliding gears into driven relation while shaft 2 is locked against rotation, breakage of some part would be almost certain to occur. Since the sliding gears 5, 6 and 7 are non-rotatably mounted, that is to say, splinably mounted upon the shaft 2 it is only necessary to lock one of these gears upon shaft 2 against rotation to keep the shaft and other gears from rotating. Since the gears 5, 6 and 7 are independently slidable, it is necessary to provide means for holding each of them in neutral position while any one of them is locked, in order safely and practically to accomplish the purpose of the present invention.

After due investigation I have found that in practically all transmission mechanisms a gear-lock may be applied with most convenience to the second or intermediate sliding gear, there being more room in the transmission case at this point for the location of a gear-lock than in any other part of the transmission casing. Therefore, in illustrating my invention for the purpose of this application I have shown the gear-lock in operative position adjacent the intermediate gear, although it is well within the spirit of the invention to apply it to any of the other sliding gears, could this be done advantageously.

The transmission lock consists of three main members, a frame 8 having a flanged end 9 adapted to be secured to the inner side wall of the transmission casing 10, a carriage 11 telescopically arranged in the end of the frame 8 which faces the intermediate gear, and a keeper 12 telescopically positioned in a suitably shaped recess in the carriage. In the present embodiment I have shown the frame, carriage, and keeper as being rectangular in cross section, and the recesses in which they telescope of corresponding shape, but there is nothing in the contemplation of the invention to impose this shape as a limitation upon any form which the invention may legitimately take. A spring 13 of rather heavy tension occupies the recess within the frame 8 and presses against the carriage 11, urging it outwardly, that is to say, toward the intermediate gear. Another spring 14, preferably of lighter tension, lies in the recess within the carriage 11 and presses against the keeper 12 urging it normally outwardly toward the gears. The keeper 12 is provided with teeth 44 adapted to mesh with the teeth on the intermediate gear. Normally the foremost of the teeth 44 merely collides with the side of one of the teeth of the intermediate gear as is indicated in Figure 3 holding the device in readiness to be inevitably locked with the gear should it be attempted to move the auto vehicle forward while the keeper 12 is in this position. The keeper is limited in its outward movement by an upturned edge 15, or equivalent means formed on a bed plate 16 which is riveted or otherwise suitably secured to the carriage 11 so as to be a unitary part thereof. The bed plate is preferably formed with lateral grooves 17 into which the flanges 18 formed on the sides of the keeper extend, so that the bed plate acts as a guideway for the keeper, retaining it against displacement.

The frame 8 is provided with an upright extension 19 projecting through a suitably formed opening in the top of the gear casing. This extension, as will be observed from Figures 4 and 5, is provided with three bores extending longitudinally through it from top to bottom. One of these bores, namely the one designated by the reference character 20 is provided with a plunger 21 normally pressed resiliently downward by a spring 22 abutting at one end against a collar 23 formed on said plunger and at the other against a suitable abutment constituted by a bushing 24. The lower end of the plunger normally bears against the top face of the carriage 11 and, when the carriage is retracted by suitable means, presently to be described, against the tension of the spring 13, the plunger finally drops into a well 25 formed in the carriage, holding the carriage in retracted position until the plunger is pulled out. It will be noted that there is no positive means for retracting the keeper 12, so that the latter remains in extended position when the carriage is returned. Upon withdrawal of the plunger 21 from the well 25 the carriage 11 moves forwardly under the urge of the spring 13 and projects the keeper 12 into contact with the teeth of the intermediate gear, which gear is presumed to be stationary at the time. At the same time, the bottom face of the bed plate 16 finds a seat upon the lay shaft 3 or some structure associated therewith, such as the bearing 26, which affords a support for the bed plate and keeper so that the latter cannot be distorted from its proper position of alinement with the gear teeth by forcible attempt to move the auto vehicle forwardly while the gear-lock is in locked position. The bottom face of the bed plate 16 is preferably formed on an inclined plane as shown at 27 so that it will ride upon the bearing 26 without colliding with the same, and the inclined plane is designed to form an abrupt shoulder 28 which engages with the bearing when the keeper is in fully locked position and acts as a stop to prevent jamming of the keeper between the intermediate gear and the bearing 26. Said abrupt shoulder functions also to prevent the carriage 11 from moving out too far, should the plunger be inadvertently withdrawn when the intermediate gear is not in neutral position and therefore not in the way to interengage the locking mechanism.

The carriage 11 is provided on its top face with a slot 29 having teeth 30 along one side thereof. The vertical extension 19 is provided in one of its bores with a shaft 31 having a pinion 32 at its lower end housed in the slot 29 and engaging the teeth 30. The upper end of the shaft 31 is provided with any suitable means for retaining it within the extension 19 such as a collar 33 against which a bushing 34 abuts, holding the shaft 31 in place. A foot pedal 35 is suitably secured to the outer end of the shaft 31. When the foot pedal is pressed the shaft 31 rotates, as does the pinion 32 at its lower end, the latter meshing with the teeth 30 and retracting the carriage. The tension of the spring 13 is sufficient to overcome the inertia and the friction of all parts associated with the shaft 31 so that when the spring expands upon release of the plunger 21 the shaft 31 and parts carried thereby are automatically rotated to the position assumed when the carriage is in extended position.

The third bore of the extension 19 contains a lock 36 having a normally extended detent 37 adapted to travel in a slot 38 formed in the upper face of the carriage and to cooperate with a resiliently mounted catch 39 borne by said carriage. Said catch has a cam face 40 on the side adjacent the intermediate gear 7, and an abrupt face 41 on the opposite side. The catch is housed in a recess 42 formed in the upper wall of the carriage and is normally pressed outwardly by a spring 43 housed in said recess. When the plunger 21 is withdrawn and the carriage is moved by the spring 13 toward the gears, the catch 39 rides over the cam face 37 of the detent, depressing the latter below the plane of the upper end of the slot 38, and, when the catch passes said detent 39 the latter springs up under the urge of the spring 43 confronting the abrupt face 41 of said detent so that the carriage cannot move backwards while the catch is in the way. The catch and detent thus afford a positive means for locking the gear-lock in its gear-engaging position, and the lock 36 is preferably of such character as to cause the withdrawal of the detent upon the insertion of a key into said lock, permitting the release of the carriage. The lock 36 per se forms no part of my invention, since such locks are well known.

When it is desired to lock the gears, the auto vehicle having first been brought to a standstill, it is merely necessary first to put the gear 7 in neutral and pull out the plunger 21 whereupon the carriage 11 will be moved by the spring 13 toward the gear, carrying with it the keeper 12, the latter being in normally extended position, until the foremost tooth of the keeper strikes the teeth of the intermediate gear. The advancing movement of the carriage will be limited by the abutment of the shoulder 28 against the bearing 26, while the keeper itself will be pushed back by the gear teeth against the tension of the spring 14 to the position shown in Figure 3, in readiness to go into mesh with the teeth of the intermediate gear should the auto vehicle be moved forwardly. The spring 14 acts as a shock absorber to relieve the impact of the keeper against the gear teeth. When the carriage assumes the gear-locking position, the catch 39 passes behind the detent 37 and prevents the release of the gear-lock. When the operator wishes to unlock the gears he places the key in the lock 36 withdrawing the detent 37. He then presses upon the foot pedal 35, and normally, if the auto vehicle has not been disturbed in his absence, there will be no obstruction to the return of the carriage to release position through rotation of the pinion 32 upon the teeth 30, but if an attempt has been made to move the car forward, the keeper 12 will have been drawn into the intermediate gear so as to be interlocked therewith as shown in Figure 1 so that retraction of the keeper may not be effected by pressure upon the pedal alone. In this case it is necessary for the operator to push the car a short distance in a reverse direction in order to rotate the intermediate gear 7 reversely and thereby retract the keeper 12 out of mesh with said gear. After this, pressure upon the pedal will restore the carriage to its normal inactive position in which the plunger 21 enters the well 25. The spring 14 between the carriage and keeper not only permits the auto vehicle to be pushed backwards for the purpose of releasing the keeper from the intermediate gear in the manner aforesaid, should the auto vehicle be tampered with, but it also enables the auto vehicle to be pushed any distance in a reverse direction should it be necessary to move it while parked in case of emergency such as, for instance, to make room for the fire department.

It would be an easy matter to break the gear lock or the intermediate gear 7, were the other sliding gears left free to be connected to the engine drive shaft. This is prevented by an arm 45 secured to the carriage 11 and movable therewith, having fingers 46 and 47 which straddle the low gear on shaft 2 when said gear 6 is in neutral position and fingers 49 and 50 which straddle the intermediate gear 7 when it is in neutral position and a single finger 48 adapted to prevent the intermeshment of the high gear 4, with the engine driven gear 5. When the carriage moves to locking position these fingers are introduced into the path of longitudinal movement of said gears preventing the shifting thereof while the locking device is in gear locking position. When the carriage is returned to release position said fingers are withdrawn from the path of longitudinal movement of said gears.

While I have in the above description disclosed what I believe to be a preferred and practical embodiment of my invention, it is to be understood that the specific details described are not limitative in their effect upon the invention but merely illustrative except in so far as they are expressly prescribed by the terms of the appended claims.

Having described my invention what I claim as new and desire to secure by Letters Patent, is:—

1. In combination, a gear and means for locking said gear against rotation in one direction comprising a carriage, a gear-engaging member movable with said carriage and relatively thereto, means normally biasing said gear-engaging member in a direction toward said gear, means for advancing said carriage to bring said gear-engaging member into the path of movement of said gear, said member being constructed to be entrained in the teeth of said gear upon rotation of the latter in said direction, and means for limiting the movement of said gear-engaging member in said direction, said member being retractable relatively to said carriage against said biasing means upon engagement with said gear or upon movement of said gear in the reverse direction.

2. In combination a gear and means for locking said gear against rotation in one direction comprising a carriage, a gear-engaging member movable with said carriage and relatively thereto, means normally biasing said gear-engaging member relatively to said carriage in a direction toward said gear, means for advancing said carriage to bring said gear-engaging member into the path of movement of said gear, said member being constructed to be entrained in the teeth of said gear upon rotation of the latter in said direction, means for limiting the movement of said gear-engaging member in said direction, said member being retractable relatively to said carriage against said biasing means upon engagement with said gear or upon movement of said gear in reverse direction, means for locking said carriage in advanced position, a housing for said carriage, rotatable means for withdrawing said carriage within said housing from the path of said gear when said locking means is unlocked, and resilient means for resisting withdrawal of said carriage into said housing latching said carriage in retracted position.

3. In combination a gear and means for locking said gear against rotation in one direction comprising a carriage, a gear-engaging member movable with said carriage and relatively thereto, means normally biasing said gear-engaging member in a direction toward said gear, means for advancing said carriage for bringing said gear-engaging member into the path of movement of said gear, said member being constructed to be entrained in the path of said gear upon rotation of the latter in said direction, means for limiting the movement of said gear-engaging member in said direction, said member being retractable relatively to said carriage against said biasing means upon engagement with said gear or upon movement of said gear in reverse direction, means for locking said carriage in advanced position, means comprising a foot operated pinion engageable with a rack on said carriage for withdrawing said carriage with said gear-engaging member from the path of said gear, when said locking means is unlocked and a releasable latch for holding said carriage in retracted position.

4. In combination, a gear and means for locking said gear against rotation in one direction, comprising a frame adapted to be fixedly supported, a carriage carried by said frame and movable relatively thereto, a gear-engaging member movable within said carriage and relatively thereto, means normally biasing said gear-engaging member in a direction toward said gear, means between said frame and carriage for normally biasing the latter in a direction and to an extent to bring said gear-engaging member into the path of movement of said gear, said member being constructed to be entrained in the path of said gear upon rotation of the latter in said direction, means for limiting the movement of said gear-engaging member in said direction, said member being retractable relatively to said carriage upon engagement with said gear or upon movement of said gear in reverse direction, means for locking said carriage in advanced position, means for withdrawing said carriage with said gear-engaging member from the path of said gear when said locking means is unlocked, and a releasable latch for holding said carriage in retracted position.

5. In combination, a shaft, sliding gears on said shaft each having a neutral position and being independently engageable with speed changing mechanism, means cooperating with one of said gears while it is in neutral position for locking said gear against rotation in one direction comprising means movable toward and away from said gear, means movable relatively to said first-named means and projectable into the path of movement of said gear and adapted to be entrained in the teeth of said gear upon rotation of the latter in said direction, means associated with said first-named means for limiting the movement of said projectable means in said direction, and means movable with said projectable means for retaining the other gears in neutral position, while the one gear is locked against rotation.

6. In combination, a shaft, sliding gears on said shaft each having a neutral position and being independently engageable with speed changing mechanism, means cooperating with one of said gears while it is in neutral position for locking one of said gears against rotation in one direction comprising a carriage having a gear-engaging member, means for advancing said carriage to bring said gear-engaging member into the path of movement of said gear, said member being constructed to be entrained in the teeth of said gear upon rotation of the latter in said direction, means for limiting the movement of said gear-engaging member in said direction, and means carried by said carriage for maintaining said other gears in neutral position while the one gear is locked against rotation.

7. In combination, a gear case, parallel shafts within said gear case, a gear on one shaft, means for locking said gear against rotation in one direction comprising a frame adapted to be fixedly supported within said gear case, a carriage carried by said frame and movable relatively thereto, a gear-engaging member movable with said carriage and relatively thereto, means for normally biasing said gear-engaging member in a direction toward said gear, means between said frame and carriage for normally biasing the latter in a direction and to an extent to bring said gear-engaging member into the path of movement of said gear, said carriage, when in advanced position, being supported by structure associated with said other shaft, said gear-engaging member being constructed to be entrained in the teeth of said gear upon rotation of the latter in said direction, and means for limiting the movement of said gear-engaging member in said direction, said gear-engaging member being retractable relatively to said carriage upon engagement with said gear or upon movement of said gear in reverse direction.

8. In combination, a gear case, parallel shafts within said gear case, a gear on one shaft, means for locking said gear in one direction comprising a frame adapted to be fixedly supported within said gear case, a carriage carried by said frame and movable relatively thereto, a gear-engaging member movable with said carriage and relatively thereto, means normally biasing said gear-engaging member in a direction toward said gear, means between said frame and carriage for normally biasing the latter in a direction and to an extent to bring said gear-engaging member into the path of movement of said gear, said carriage being supported when in advanced position by structure associated with said other shaft, said carriage being formed with means co-acting with said structure to limit the movement of said carriage in said direction, said gear-engaging member being constructed to be entrained in the teeth of said gear upon the rotation of the latter in said direction, and means for limiting the movement of said gear-engaging member in said direction, said gear-engaging member being retractable relatively to said carriage upon engagement with said gear or upon movement of said gear in a reverse direction.

In testimony whereof I have hereunto set my hand.

FRANK D. CARPENTER.